(12) United States Patent
McIntire et al.

(10) Patent No.: US 9,681,160 B2
(45) Date of Patent: Jun. 13, 2017

(54) METHOD AND APPARATUS FOR AUTOMATICALLY ASSOCIATING MEDIA SEGMENTS WITH BROADCAST MEDIA STREAMS

(75) Inventors: John P. McIntire, Palo Alto, CA (US); Michael Downing, San Francisco, CA (US)

(73) Assignee: Tout Inc., San Francisco, CA (US)

( * ) Notice: Subject to any disclaimer, the term of this patent is extended or adjusted under 35 U.S.C. 154(b) by 124 days.

(21) Appl. No.: 13/530,274

(22) Filed: Jun. 22, 2012

(65) Prior Publication Data

US 2012/0331169 A1    Dec. 27, 2012

Related U.S. Application Data

(60) Provisional application No. 61/499,935, filed on Jun. 22, 2011.

(51) Int. Cl.
| | |
|---|---|
| *G06F 15/16* | (2006.01) |
| *H04N 21/236* | (2011.01) |
| *H04N 21/258* | (2011.01) |
| *H04N 21/2665* | (2011.01) |
| *H04N 21/2668* | (2011.01) |
| *H04N 21/278* | (2011.01) |
| *H04N 21/4223* | (2011.01) |
| *H04N 21/4722* | (2011.01) |
| *H04N 21/81* | (2011.01) |
| *H04N 21/84* | (2011.01) |
| *H04N 21/845* | (2011.01) |

(52) U.S. Cl.
CPC . *H04N 21/23614* (2013.01); *H04N 21/25891* (2013.01); *H04N 21/2665* (2013.01); *H04N 21/2668* (2013.01); *H04N 21/278* (2013.01); *H04N 21/4223* (2013.01); *H04N 21/4722* (2013.01); *H04N 21/8133* (2013.01); *H04N 21/84* (2013.01); *H04N 21/8456* (2013.01)

(58) Field of Classification Search
CPC ............. H04N 21/00; H04N 21/23614; H04N 21/8133; H04N 21/84; H04N 21/278
USPC ....................................................... 709/231
See application file for complete search history.

(56) References Cited

U.S. PATENT DOCUMENTS

| | | | |
|---|---|---|---|
| 2004/0126038 A1* | 7/2004 | Aublant ............ | G06F 17/30265 382/305 |
| 2007/0250901 A1* | 10/2007 | McIntire et al. ............... | 725/146 |
| 2008/0117201 A1* | 5/2008 | Martinez ........... | G06F 17/30035 345/418 |
| 2008/0256080 A1* | 10/2008 | Irvin et al. ...................... | 707/10 |
| 2009/0100013 A1* | 4/2009 | Fein et al. ......................... | 707/3 |
| 2009/0248672 A1* | 10/2009 | McIntire et al. .................... | 707/5 |
| 2010/0146042 A1* | 6/2010 | Kruhoeffer et al. .......... | 709/203 |
| 2010/0332497 A1* | 12/2010 | Valliani ............. | G06F 17/30781 707/759 |
| 2011/0126236 A1* | 5/2011 | Arrasvuori ......... | H04N 21/4532 725/46 |
| 2011/0184807 A1* | 7/2011 | Wang et al. ................ | 705/14.53 |
| 2012/0331502 A1* | 12/2012 | McIntire et al. ................ | 725/32 |

* cited by examiner

*Primary Examiner* — Vivek Srivastava
*Assistant Examiner* — Nicholas Celani

(57) ABSTRACT

A method for creating a compound media stream includes obtaining a first media segment, obtaining a first matching criterion, and automatically associating the first media segment with an existing media stream to produce the compound media stream.

20 Claims, 4 Drawing Sheets

METHOD AND APPARATUS FOR AUTOMATICALLY ASSOCIATING MEDIA SEGMENTS WITH BROADCAST MEDIA STREAMS

CROSS REFERENCE TO RELATED APPLICATIONS

This application claims the benefit of U.S. Provisional Patent Application Ser. No. 61/499,935, filed Jun. 22, 2011, which is herein incorporated by reference in its entirety.

FIELD OF THE INVENTION

The present invention generally relates to the field of media distribution, and more specifically relates to the creation of media streams.

SUMMARY OF THE INVENTION

A method for creating a compound media stream includes obtaining a first media segment, obtaining a first matching criterion, and automatically associating the first media segment with an existing media stream to produce the compound media stream.

BRIEF DESCRIPTION OF THE DRAWINGS

The teachings of the present invention can be readily understood by considering the following detailed description in conjunction with the accompanying drawings, in which.

DETAILED DESCRIPTION

In one embodiment, the present invention is a method and apparatus for automatically associating media segments with broadcast media streams. Embodiments of the invention automatically associate short media segments (or alternatively streams comprising multiple short media segments) with existing media streams, such as broadcast media streams, to create compound media streams. Various matching criteria, which may be based on observed commonalities between media segments, on user-specified attributes, or on other factors, may be used to make the associations. Once a compound media stream is assembled, it can be distributed to users.

Figure 1:
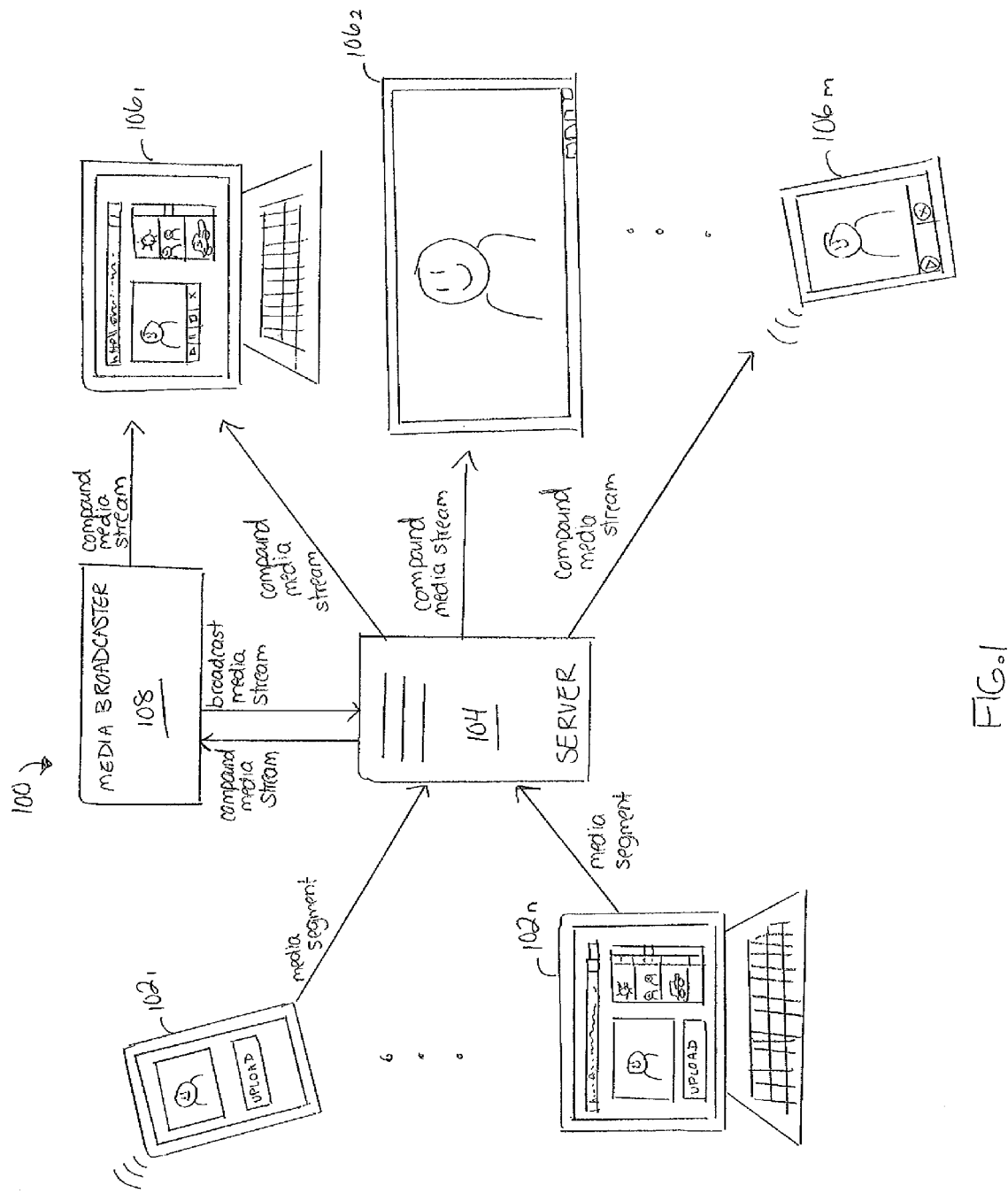
FIG. 1 is a schematic diagram illustrating one embodiment of a high-level system for automatically associating media segments with broadcast media streams, according to the present invention.

FIG. 1 is a schematic diagram illustrating one embodiment of a high-level system 100 for automatically associating media segments with broadcast media streams, according to the present invention. As illustrated, the system 100 is a computer network comprising a plurality of user input devices $102_1$-$102_n$ (hereinafter collectively referred to as "user input devices 102"), at least one server 104, a plurality of user output devices $106_1$-$106_m$ (hereinafter collectively referred to as "user output devices 106"), and at least one media broadcaster 108. Collectively, the user input devices 102, server 104, and user output devices 106 run an application that automatically creates and distributes compound media streams based at least in part on user-provided media and on broadcast media streams.

The user input devices 102 comprise computing devices having network interfaces that allow connection to the computer network. Thus, the user input devices 102 may include, for example, personal computers (e.g., desk top computers, laptop computers, tablet computers), cellular telephones, or personal digital assistants, among other devices. Each of the user input devices 102 runs an application that allows a user to create, store, and/or upload (to the server 104) a media segment (e.g., a multimedia file such as a still image, a video, or an audio recording). To this end, at least some of the user input devices 102 may additionally comprise a recording device (e.g., a still camera, a video camera, an audio recorder) and/or editing software that facilitates creation of the media segment. In addition, the application allows the user to transmit to the server 104 a matching criterion for use in associating media segments, as discussed in greater detail below.

The server 104 hosts the application that is run on the user input devices 102. In addition, the server 104 receives the media segments and the matching criteria from the user devices 102 and receives broadcast media streams from the media broadcaster. The server 104 uses the received data to automatically associate media segments with broadcast media streams, thereby producing a compound media stream, as discussed in greater detail below. Each compound media stream comprises at least one media segment and at least one broadcast media stream. The media streams are then stored on the server 104 and/or delivered to the media broadcaster 108 for distribution.

The user output devices 106, like the user input devices 102, comprise computing devices having network interfaces that allow connection to the computer network. In addition, each of the user output devices 106 includes at least one multimedia output (e.g., a display, a speaker, or the like) that allows for consumption of a compound media stream. Thus, the user output devices 106 may include, for example, personal computers (e.g., desk top computers, laptop computers, tablet computers), cellular telephones, personal digital assistants, Internet-ready televisions, set top boxes, gaming consoles, among other devices. Each of the user output devices 106 runs the application that allows a user receive (from the server 104 and/or from the media broadcaster 108) and consume a compound media stream.

The media broadcaster 108 distributes media streams to a dispersed audience via the user output devices 106. For instance, the media broadcaster 108 may be a television broadcaster (e.g., a network, cable, or satellite broadcaster), a radio broadcaster, a web broadcaster, or the like.

In some cases, a computing device may be both a user input device 102 and a user output device 106. For instance, a user could both upload media segments and download or stream compound media streams on his cellular telephone. Thus, any of the links illustrated in FIG. 1 could be a bidirectional link.

Figure 2:
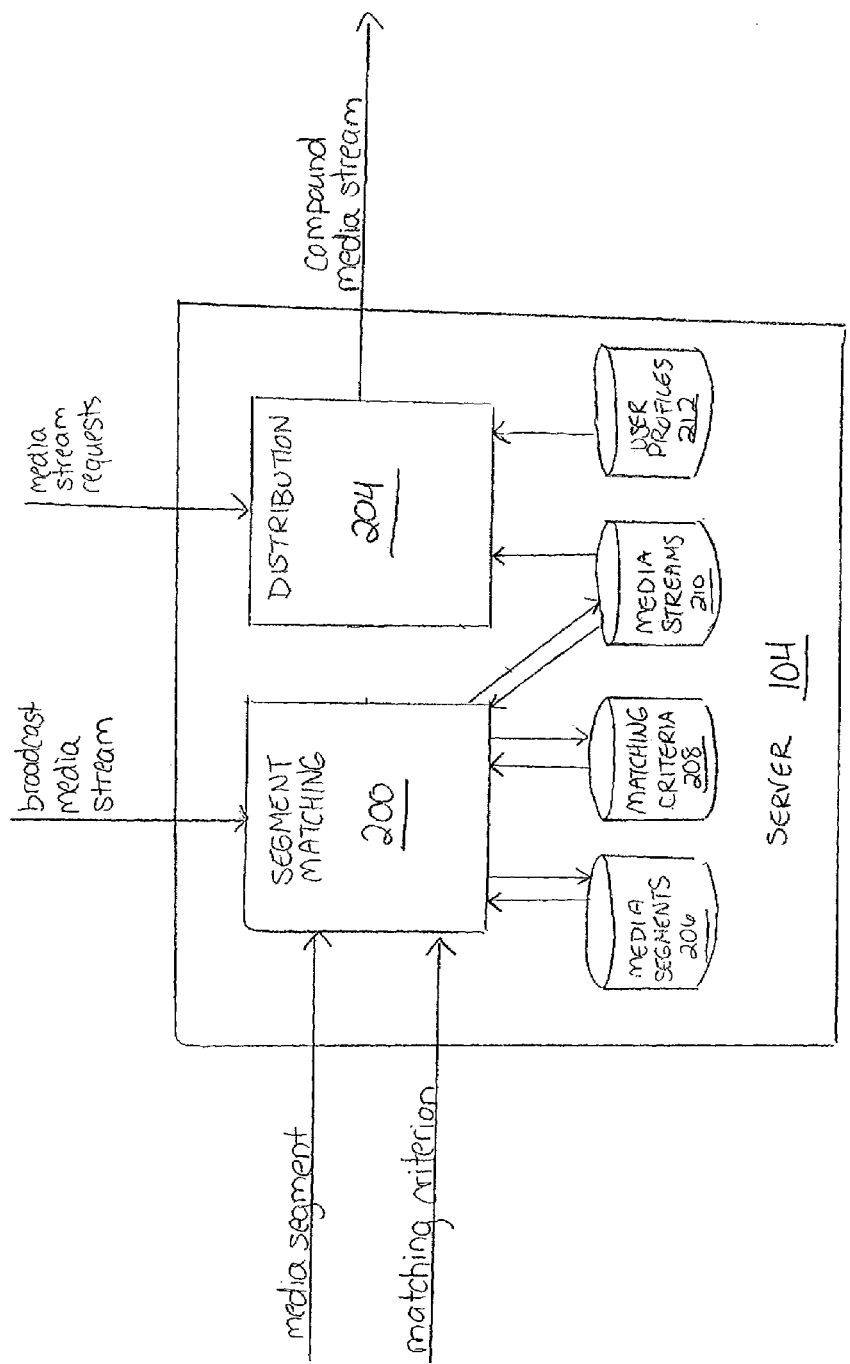
FIG. 2 is a schematic diagram illustrating the server of FIG. 1 in more detail.

FIG. 2 is a schematic diagram illustrating the server 104 of FIG. 1 in more detail. As illustrated, the server 104 includes a segment matching processor 200, a distribution processor 204, and a plurality of databases, namely, a media segments database 206, a matching criteria database 208, a media streams database 210, and a user profiles database 212.

The segment matching processor 200 receives media segments and matching criteria from the user input devices 102 illustrated in FIG. 1. The segment matching processor 200 stores incoming media segments and matching criteria in the segments database 206 and matching criteria database 208, respectively. The segment matching processor 200 also receives broadcast media streams from the media broadcaster(s) 108. In addition, as discussed in greater detail below, the segment matching processor 200 uses the matching criteria stored in the matching criteria database 208 to automatically associate media segments stored in the media segments database 206 with incoming broadcast media streams. This results in the creation of compound media streams, which are stored by the segment matching processor 200 in the media streams database 210.

The distribution processor 204 is responsible for distributing compound media streams to the user output devices 106 and/or media broadcasters 108 illustrated in FIG. 1. As discussed in greater detail below, the distribution processor 204 may use media stream requests and/or user profiles stored in the user profiles database 212 to determine which stored compound media streams from the media streams database 210 should be delivered to which user output devices 106. Alternatively, the distribution processor 204 may forward the compound media streams to the media broadcaster(s) 108, who then redistribute the compound media streams to the user output devices 106. For instance, the compound media streams may be redistributed by a cable television news broadcaster to an Internet-ready television tuned to a channel operated by the cable television news broadcaster.

As discussed above, the media segments database 206 stores a plurality of media segments. In one embodiment, the media segments that are stored in the media segments database 206 comprise video segments. In a further embodiment, none of the video segments is longer than a defined maximum length or limit (e.g., x seconds). One or more of the video segments may be tagged with metadata that describes the video segment (e.g., when or where the video segment was filmed, who submitted the video segment, keywords relating to the content of the video segment, etc.).

The matching criteria database 208 stores matching criteria that are used to associate media segments stored in the media segments database 206 with broadcast media streams. A matching criterion may be explicitly provided by a source of a media segment or broadcast media stream (e.g., "This video segment relates to event X") or may be implicitly inferred by the server 104 or a human administrator based on metadata associated with the media segments or other processing (e.g., a video segment may be tagged with a location from which it was filmed and/or submitted).

The media streams database 210 stores compound media streams, each compound media stream comprising a broadcast media stream associated with one or more media segments. For instance, a compound media stream may comprise a video news stream distributed by particular television news broadcaster and relating to a particular event associated with a video segment of the same event that has been submitted by a user (e.g., user X). Compound media streams stored in the media streams database 210 may be updated at any time to include new media segments. For instance, the compound media stream comprising the video news stream associated with user X's video segment may be updated in real time to include a newly received video segment filmed by another user (e.g., user Y).

The user profiles database 212 stores user profiles, which describe users of the system 100. For instance, a user profile may include a summary of all media segments submitted by or otherwise associated with user X. In addition, the user profile may include a summary of sources of broadcast media streams or of media segments to which user X subscribes. The user profile may also generally describe user X's preferences, such as subjects in which user X is interested. Thus, the user profile may be used to match a new media segment received from user X with a broadcast media stream. Additionally, the user profile may be used to alert user X to the creation of a new compound media stream that is associated with one of user X's subscriptions, that matches user X's preferences, or that relates to a media segment previously submitted by user X. At least some of the information in a user profile may be made available to other users, for example in the form of a web page. In one embodiment, a user may specify which portions of his user profile he wishes to make available to others and/or which other users have access to his user profile.

Figure 3:
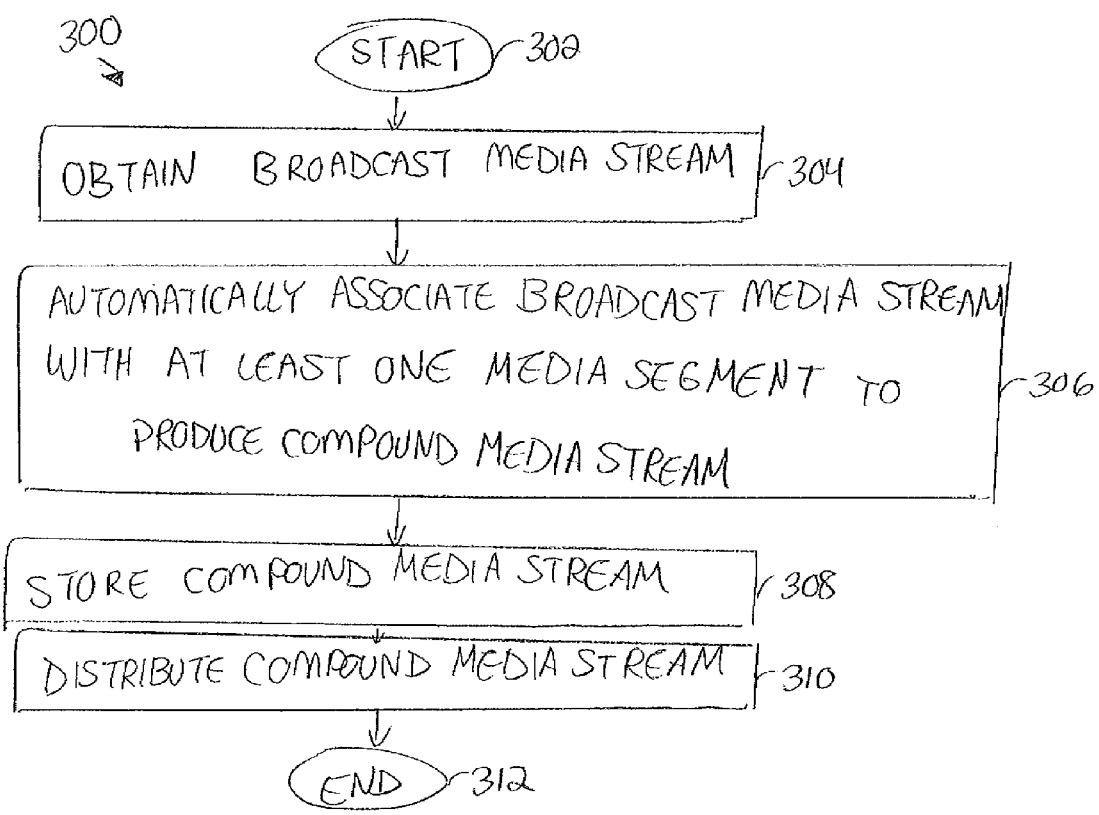
FIG. 3 is a flow diagram illustrating one embodiment of a method for automatically associating media segments with broadcast media streams, according to the present invention.

FIG. 3 is a flow diagram illustrating one embodiment of a method 300 for automatically associating media segments with broadcast media streams, according to the present invention. The method 300 may be implemented, for example, at the server 104 illustrated in FIGS. 1 and 2. As such, reference is made in the discussion of the method 300 to various elements illustrated in FIG. 2. It will be appreciated however, that the method 300 is not limited to implementation with the server configuration illustrated in FIG. 2, and that such references are made largely to facilitate explanation.

The method 300 is initialized at step 302 and proceeds to step 304, where the server 104 obtains a broadcast media stream. For instance, the broadcast media stream may comprise a video news segment including live footage from an event in progress.

In step 306, the segment matching processor 200 automatically associates the broadcast media stream with one or more media segments to produce a compound media stream. The association satisfies at least one matching criterion. For instance, if the matching criterion is a tag associated with a video segment that indicates that the video segment was filmed during a baseball game that is currently in progress, then the video segment might be associated with a broadcast media stream comprising a live video broadcast of the baseball game. In this case, the video segment may have been filmed by a user other than the media broadcaster 108, such as a fan who is attending the game.

In one embodiment, user permission may be solicited before associating a media segment submitted by the user with a broadcast media stream. For instance, the server 104 may send a recommendation to the user recommending that the media segment be associated with the broadcast media stream and seeking approval to make the association. Similarly, the server 104 may seek permission from the relevant media broadcaster 108 before associating the media segment with the broadcast media stream.

In yet another embodiment, the segment matching processor 200 may associate relevant advertising material and/or other related content with the compound media stream. For example, if the compound media stream comprises a live video broadcast of a baseball game associated with a video segment filmed during the baseball game as discussed above, the compound media stream might include the home team's schedule or an advertisement that allows viewers to purchase tickets to an upcoming game.

In step 308, the compound media stream is stored in the media streams database 210. In one embodiment, the compound media stream may tagged with keywords or other metadata describing the compound media stream.

In step 310, the compound media stream is distributed by the distribution processor 204. Distribution of the compound media stream may comprise pushing the compound media stream or a hyperlink to user output devices operated by users whose preferences and/or subscriptions (e.g., as described in their user profiles) match the compound media stream. Alternatively, distribution to these users may involve simply sending an alert that informs the users that the compound media stream is available (e.g., by accessing a particular web site). In yet another embodiment, where the compound media stream comprises media segments received from a particular geographic location, the compound media stream may be distributed to users who have indicated that they are currently at or near that particular geographic location.

The method 300 terminates in step 312.

The present invention therefore assembles, in substantially real time, compound media streams comprising broadcast media streams and media segments from third-party (i.e., non-media broadcaster) users. This allows broadcast media streams to be supplemented with third-party content that may provide additional and varying perspectives on the content of the broadcast media streams. For instance, as discussed above, a live video broadcast of a baseball game can be supplemented with short video segments submitted by fans who are in attendance at the game.

As discussed above, media segments may be associated with broadcast media streams based any one or more of a number of various matching criteria, including, but not limited to: the location from which the media segments and/or broadcast media streams were submitted or created, the time period during which the media segments and/or broadcast streams were submitted or created, the source(s) of the media segments and/or broadcast media streams (i.e., submitting users), the media segments and/or broadcast media streams that the most users have viewed, the media segments and/or broadcast media streams that have been rated most highly by viewers, the contents of the media segments and/or broadcast media streams (e.g., subject matter), social relationships associated with the media segments and/or broadcast media streams (e.g., media segments depicting friends, family, or the like), or information from third-party sources.

The matching criteria may be explicitly specified (e.g., user-defined) or implicitly inferred (e.g., observed through metadata). For instance, the server 104 (or a human administrator with access to the server 104) may note that a video segment was received from roughly the same geographic location that is depicted in a current broadcast media stream. Alternatively, a media broadcaster 108 may request that media segments from particular users be associated with broadcast media streams when appropriate (e.g., when relevant to the subject matter of the broadcast media streams).

Figure 4:
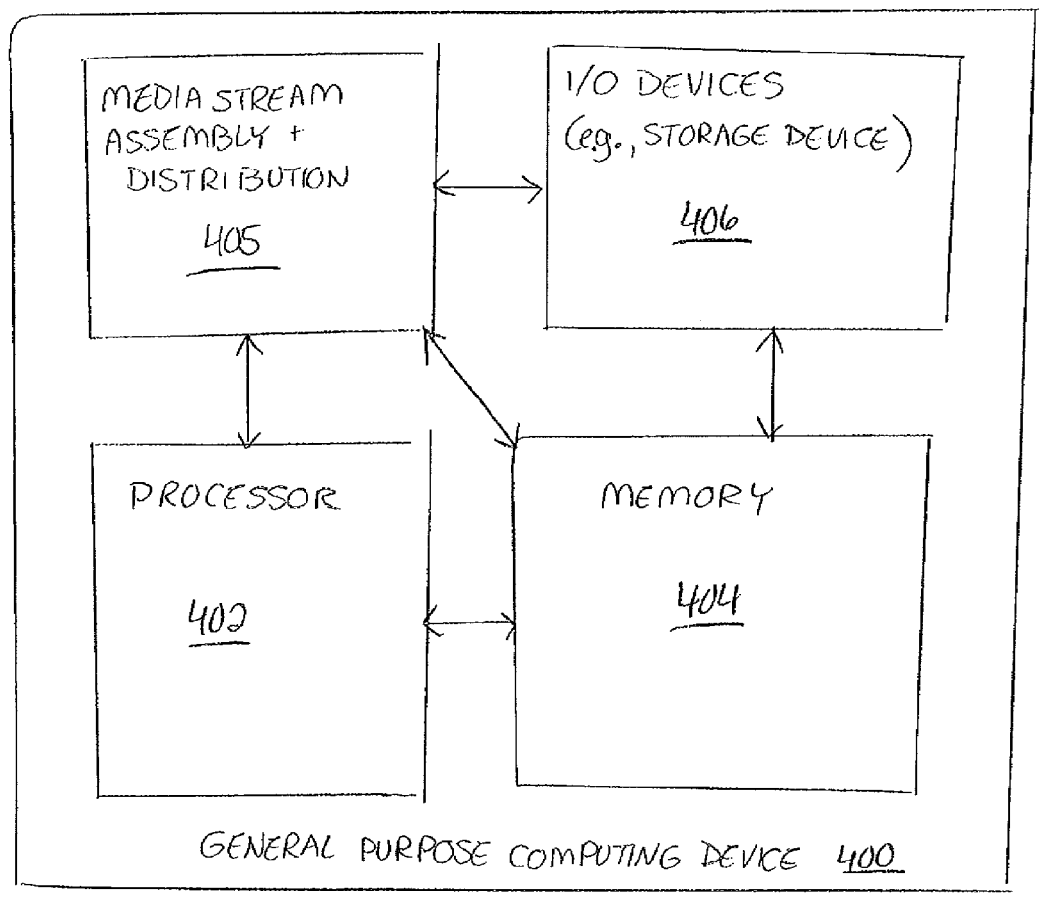
FIG. 4 is a high level block diagram of the present invention implemented using a general purpose computing device.

FIG. 4 is a high level block diagram of the present invention implemented using a general purpose computing device 400. It should be understood that embodiments of the invention can be implemented as a physical device or subsystem that is coupled to a processor through a communication channel. Therefore, in one embodiment, a general purpose computing device 400 comprises a processor 402, a memory 404, a compound media stream assembly and distribution module 405, and various input/output (I/O) devices 406 such as a display, a keyboard, a mouse, a modem, a microphone, speakers, a touch screen, an adaptable I/O device, and the like. In one embodiment, at least one I/O device is a storage device (e.g., a disk drive, an optical disk drive, a floppy disk drive).

Alternatively, embodiments of the present invention (e.g., compound media stream assembly and distribution module 405) can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the compound media stream assembly and distribution module 405 for automatically associating media segments with broadcast media streams described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method comprising:

storing a first video segment provided by a first user over a content distribution network, wherein the first video segment is tagged with a first set of metadata that includes a first tag specifying a venue at which the first video segment was filmed, and wherein the first video segment is stored in a database that limits respective durations of all video segments stored in the database, including the first video segment, to no longer than a defined maximum length;

identifying, using a processor, a live broadcast media stream that depicts the venue at which the first video segment was filmed by matching a second tag in a second set of metadata tagging the live broadcast stream to the first tag, wherein the live broadcast media stream is provided by a second user;

updating, using the processor, the live broadcast media stream to include the first video segment, thereby producing an updated live broadcast media stream;

identifying a third user who has indicated that he or she is currently present at the venue at which the first video segment was filmed;

responsive to the identifying the third user, distributing a hyperlink over the content distribution network to a mobile device operated by a third user to alert the third user to the existence of the updated live broadcast media stream; and streaming the updated live broadcast media stream over the content distribution network to the mobile device operated by the third user upon activation of the hyperlink by the mobile device.

2. The method of claim 1, wherein the live broadcast media stream is longer in duration than the first video segment.

3. The method of claim 1, wherein the second user is a media broadcaster.

4. The method of claim 3, wherein the live broadcast media stream is a news broadcast.

5. The method of claim 4, wherein the news broadcast includes live footage of an event occurring at the venue at which the first video segment was filmed.

6. The method of claim 5, wherein the first user is an attendee of the event, other than the media broadcaster.

7. The method of claim 1, wherein the transmitting comprises:
   delivering the live broadcast media stream, as updated, to the second user for distribution to consumers.

8. The method of claim 1, wherein a duration of the live broadcast media stream is unlimited and a duration of the updated live broadcast media stream is unlimited.

9. The method of claim 1, wherein a third tag included in the first set of metadata specifies a time period during which the first video segment was filmed.

10. The method of claim 1, wherein a third tag included in the first set of metadata specifies a time period during which the first video segment was received by a server.

11. The method of claim 1, wherein the updated further comprises:
   adding additional content other than the first video segment to the live broadcast media stream.

12. A non-transitory computer readable medium containing an executable program, where the executable program causes a processor to perform operations comprising:
   storing a first video segment provided by a first user over a content distribution network, wherein the first video segment is tagged with a first set of metadata that includes a first tag specifying a venue at which the first video segment was filmed, and wherein the first video segment is stored in a database that limits respective durations of all video segments stored in the database, including the first video segment, to no longer than a defined maximum length;
   identifying a live broadcast media stream that depicts the venue at which the first video segment was filmed by matching a second tag in a second set of metadata tagging the live broadcast stream to the first tag, wherein the live broadcast media stream is provided by a second user;
   updating, using the processor, the live broadcast media stream to include the first video segment, thereby producing an updated live broadcast media stream;
   identifying a third user whose current presence at the venue at which the first video segment was filmed has been indicated in a profile associated with the third user; responsive to the identifying the third user, distributing a hyperlink over the content distribution network to a mobile device operated by a third user to alert the third user to the existence of the updated live broadcast media stream; and
   streaming the updated live broadcast media stream over the content distribution network to the mobile device operated by the third user upon activation of the hyperlink by the mobile device.

13. A system, comprising:
   a processor; and
   a computer readable medium containing an executable program that causes the processor to perform operations comprising:
   storing a first video segment provided by a first user over a content distribution network, wherein the first video segment is tagged with a first set of metadata that includes a first tag specifying a venue at which the first video segment was filmed, and wherein the first video segment is stored in a database that imposes a limit on respective durations of all video segments stored in the database, including the first video segment, to no longer than a defined maximum length;
   identifying a live broadcast media stream that depicts the venue at which the first video segment was filmed by matching a second tag in a second set of metadata tagging the live broadcast stream to the first tag, wherein the live broadcast media stream is provided by a second user;
   updating, using the processor, the live broadcast media stream to include the first video segment, thereby producing an updated live broadcast media stream;
   identifying a third user whose current presence at the venue at which the first video segment was filmed has been indicated in a profile associated with the third user;
   responsive to the identifying the third user, distributing a hyperlink over the content distribution network to a mobile device operated by a third user to alert the third user to the existence of the updated live broadcast media stream; and
   streaming the updated live broadcast media stream over the content distribution network to the mobile device operated by the third user upon activation of the hyperlink by the mobile device.

14. The method of claim 1, further comprising:
   subsequent to the streaming, updating the live broadcast media stream to include a second video segment different from the first video segment.

15. The method of claim 1, wherein a third tag included in the first set of metadata identifies an event that is depicted in the first video segment.

16. The method of claim 1, wherein a current location of the third user is dynamically changeable.

17. The method of claim 1, wherein the first video segment is received from a communication device that also recorded the first video segment.

18. The method of claim 1, wherein the venue is a public place.

19. The method of claim 1, wherein the hyperlink is distributed to the third user without the third user explicitly requesting.

20. The method of claim 1, further comprising:
   storing a second video segment provided by a fourth user over the content distribution network, wherein the second video segment is tagged with a third set of metadata that includes a third tag identifying a venue at which the second video segment was filmed, wherein the second video segment is stored in the database;
   detecting that the third tag matches the first tag; and
   updating the updated live broadcast media stream to include the second video segment.

* * * * *